(12) United States Patent
Cheng

(10) Patent No.: US 9,567,977 B2
(45) Date of Patent: Feb. 14, 2017

(54) DEVICE FOR CONTROLLING TORQUE OUTPUT OF WIND TURBINE BLADES

(71) Applicant: Institute of Nuclear Energy Research, Atomic Energy Council, Executive Yuan, R.O.C., Taoyuan County (TW)

(72) Inventor: Kuei-Jen Cheng, Taoyuan County (TW)

(73) Assignee: INSTITUTE OF NUCLEAR ENERGY RESEARCH, ATOMIC ENERGY COUNCIL, Executive Yuan R.O.C., Lungtan, Taoyuan (TW)

( * ) Notice: Subject to any disclaimer, the term of this patent is extended or adjusted under 35 U.S.C. 154(b) by 305 days.

(21) Appl. No.: 14/516,751

(22) Filed: Oct. 17, 2014

(65) Prior Publication Data

US 2016/0108891 A1    Apr. 21, 2016

(51) Int. Cl.
*F03D 7/02* (2006.01)
*F03D 7/04* (2006.01)

(52) U.S. Cl.
CPC ............. *F03D 7/041* (2013.01); *F03D 7/0224* (2013.01); *F03D 7/0248* (2013.01); *F03D 15/00* (2016.05); *F05B 2270/1032* (2013.01)

(58) Field of Classification Search
CPC ...... F03D 7/0224; F03D 7/0248; F03D 7/041; F03D 11/02; F03D 15/00; F05B 2270/1032
See application file for complete search history.

(56) References Cited

U.S. PATENT DOCUMENTS

| | | | | |
|---|---|---|---|---|
| 3,023,814 A * | 3/1962 | Blount | ..................... | B63H 3/04 416/152 |
| 3,794,441 A * | 2/1974 | Johnson | .................. | B63H 3/04 416/152 |
| 4,193,005 A * | 3/1980 | Kos | ....................... | F03D 7/0224 290/44 |
| 4,310,284 A * | 1/1982 | Randolph | ............. | F03D 7/0224 416/11 |
| 4,348,154 A * | 9/1982 | Ducker | ................. | F03D 7/0224 416/104 |
| 4,357,542 A * | 11/1982 | Kirschbaum | ......... | F03D 7/0272 174/DIG. 15 |
| 4,490,093 A * | 12/1984 | Chertok | ................ | F03D 7/0224 416/152 |
| 4,632,637 A * | 12/1986 | Traudt | .................. | F03D 1/0608 416/11 |
| 8,203,229 B2 * | 6/2012 | Stone | .................... | F03D 7/0248 290/4 R |
| 8,334,610 B2 * | 12/2012 | Migliori | .................. | F01D 17/10 290/44 |

* cited by examiner

*Primary Examiner* — Igor Kershteyn

(74) *Attorney, Agent, or Firm* — Jackson IPG PLLC; Demian K. Jackson

(57) ABSTRACT

The present invention is a device for controlling torque output of wind turbine blades, which can effectively keep the torque output of the blades of a wind turbine in constant and maintain the output stability of the wind turbine further. The present invention does not need any external power input and measurement signal generated from other devices and is a fully passive device which keeps the output of a wind turbine in constant. When the wind speed varies in the rated range, the present invention would adjust the pitch angle of the blades correspondingly and keep the output of a wind turbine in constant. When the wind speed is not in the rated range, the present invention would stop the rotation of the blades, so the output stability of the wind turbine can be kept, and the durability of the wind turbine can also be maintained.

8 Claims, 5 Drawing Sheets

DEVICE FOR CONTROLLING TORQUE OUTPUT OF WIND TURBINE BLADES

FIELD OF THE INVENTION

The present invention relates to a device for controlling the torque output of the blades of a wind turbine, and particularly to such device, which could effectively control and maintain the torque output of the blades of a wind turbine to the generator without requiring any external power input and measurement signal generated from other devices.

DESCRIPTION OF THE RELATED ART

A wind turbine is mainly composed of blades, a transmission system, a generator, and a control system. To maintain a constant output of the generator, the blades or the transmission system has to be adjusted by the control system to maintain a constant torque input to the generator. When the torque inputted to the generator is not in the rated range, no matter it is too high or too low, the output of the generator will fail to meet what are required in the specification and would cause exceptions. Besides, an exceeding torque input would also shorten the service life of the associate components of a wind turbine.

Currently, the wind turbine mostly maintains the constant torque inputted to the generator by measuring the rotation speed or the torque exerted on the generator from the transmission system. Afterward the control system processes the measurement signals and then drives an oil hydraulic equipment to change the pitch angles of the blades of the wind turbine to adjust the power coefficient of the blades.

In addition, an anemometer is employed to measure the wind speed. When the wind speed is lower than or beyond the rated range, the control system manipulates the oil hydraulic equipment or other manners to drive the braking system to stop the rotation of the blades of the wind turbine.

Currently, most of the wind turbines in the market utilize an anemometer, a torsiometer, and a tachometer to measure the wind speed, the torque exerts on the generator, and the rotation speed of the spindle of the generator respectively. The control system would take these measurement signals as the control inputs to control the pitch angle of the blades and verify whether the braking system must be activated to stop the rotation of the blades. Thus, the pitch angle of the blades and the braking system could be controlled well, and the torque output of the blades can be maintained.

However, the measuring equipment and the drivers of the braking system and the pitch angle adjustment system, such as oil hydraulic equipment, all would consume energy. Besides, the utilization of the measuring equipment and the drivers not only increases the composition complexity of the wind turbine but also increases the set-up and operation cost. Besides, the reliability of this kind of wind turbine is also reduced because of the composition complexity. Therefore, the prior art may not meet with the requirement for the user's actual need.

SUMMARY OF THE INVENTION

The object of the present invention is to provide a fully passive device for keeping the output of a wind turbine in constant. The present invention maintains the output stability of the wind turbine by controlling the torque which the blades generate without requiring any external power input or and any measurement signal generated from other equipment. Hence, the energy consumption, the composition complexity, the set-up and the operation cost of the wind turbine would be effectively reduced, while the reliability can be preserved or improved.

To achieve the above objects, the present invention comprises a coaxial planetary gearbox, a front high speed transmission axis, a torque control device, a rear high speed transmission axis, a braking system, and a pitch angle adjustment axis. A coaxial planetary gearbox is installed on a framework to convert a low rotation speed and high torque input generated by the blades into a high rotation speed and low torque output. A front high speed transmission axis connects to the planetary gearbox to transmit the high rotation speed and low torque output to a torque control device. A torque control device connects to the front high speed transmission axis to transmit the torque from the front high speed transmission axis to a rear high speed transmission axis. The torque control device comprises a transmission sliding bush, a thrust flange fixed on the transmission sliding bush, a torque maintaining spring connects the thrust flange and a thrust block fixed on the framework. The transmission sliding bush comprises a front ring, a front key, a connector, a rear key and a rear ring. A rear high speed transmission axis connects to the torque control device to transmit the torque from the torque control device to a generator. A braking system is installed on the framework and is between the coaxial planetary gearbox and the generator to stop the rotation of the blades when the wind speed is not in the rated range. A pitch angle adjustment axis connects a pitch angle adjustment device which adjusts the pitch angle of the blades and the torque control device to transmit the pitch angle adjustment output from the torque control device to the pitch angle adjustment device so the torque output of the blades can be kept in constant.

In a preferred embodiment of the present invention, the front transmission axis has a front guide which connects to the front key and is disposed at the farther end away from the coaxial planetary gearbox.

In a preferred embodiment of the present invention, the shape of the front guide depends on the magnitude of the torque being transmitted and the properties of the torque maintaining spring.

In a preferred embodiment of the present invention, the configuration of the torque control device can be a cylinder type, a linkage type, or a combination of the previous two.

In a preferred embodiment of the present invention, the rear high speed transmission axis has a rear guide which connects to the rear key and is disposed at the farther end away from the generator.

In a preferred embodiment of the present invention, the shape of the rear guide depends on the magnitude of the torque being transmitted and the properties of the torque maintaining spring.

In a preferred embodiment of the present invention, the braking system comprises a front braking driving ring installed on the front high speed transmission axis, a rear braking driving ring installed on the rear high speed transmission axis, a disk braking calipers fixed on the framework, and a braking disk fixed on the rear high speed transmission axis and partially contained in the disk braking calipers.

In a preferred embodiment of the present invention, the configuration of the pitch angle adjustment axis can be a solid axis, a hollow axis, a bush, or a combination of the previous three.

In a preferred embodiment of the present invention, the pitch angle adjustment axis connects the pitch angle adjustment device and the torque control device.

In a preferred embodiment of the present invention, a low speed transmission axis is disposed between the blades and the coaxial planetary gearbox to transmit the torque from the blades to the coaxial planetary gearbox.

BRIEF DESCRIPTIONS OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENTS

Figure 1:
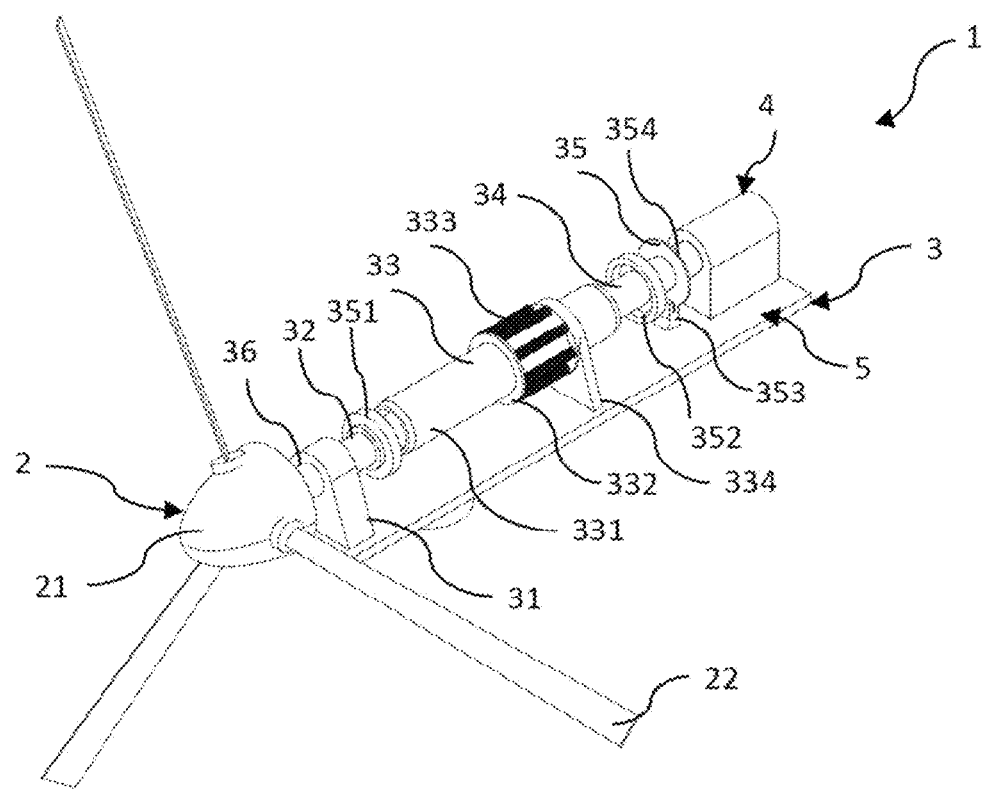
FIG. 1 is a schematic isometric view of a wind turbine according to the present invention.
Figure 2:
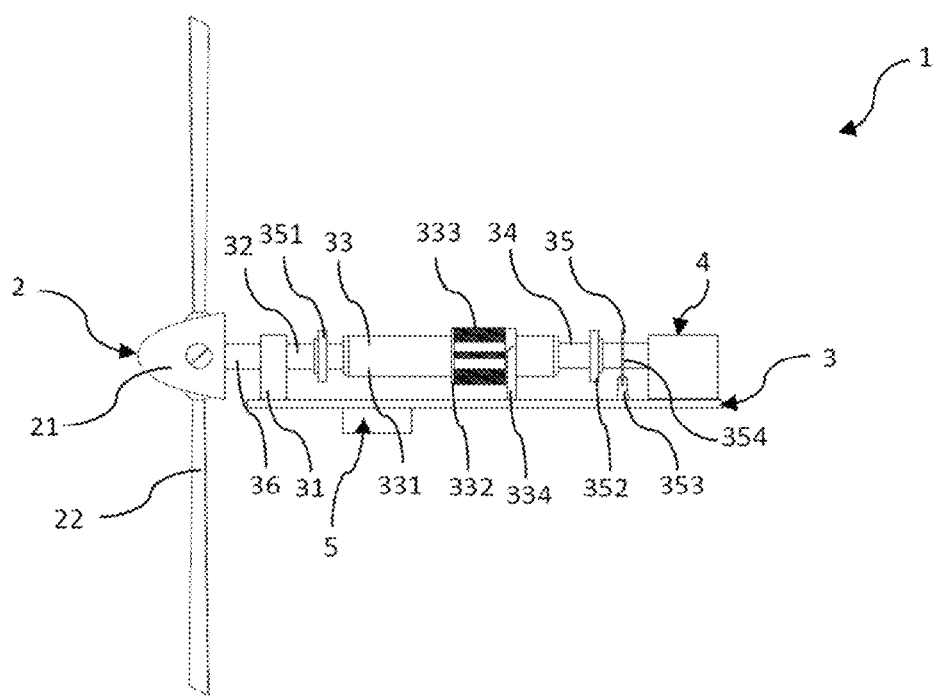
FIG. 2 is a schematic side view of the wind turbine according to the present invention.
Figure 3:
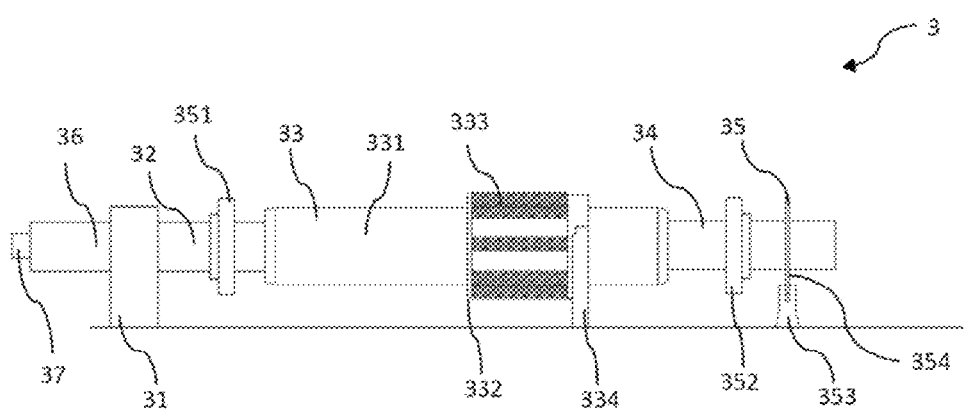
FIG. 3 is a schematic side view of the present invention.
Figure 4:
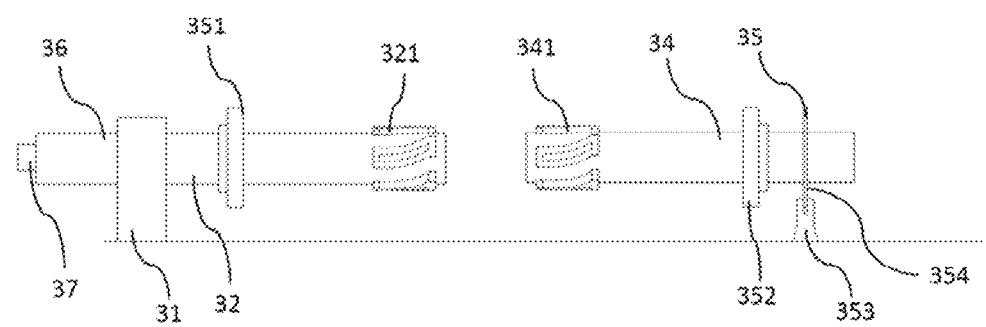
FIG. 4 is a schematic partial side view of the present invention.
Figure 5:
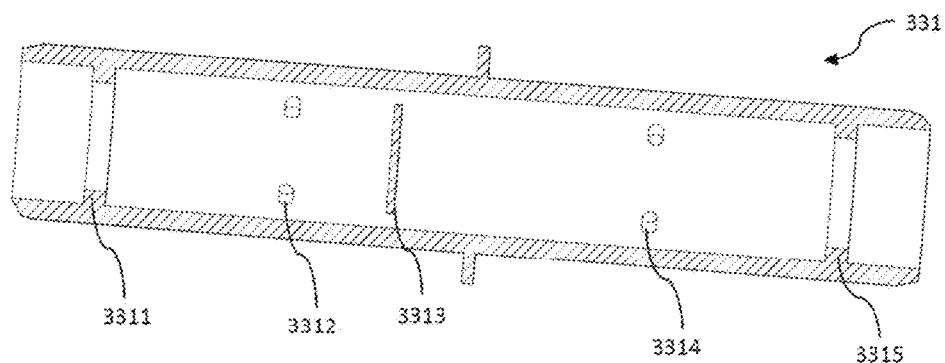
FIG. 5 is a schematic cross sectional view of the transmission sliding bush according to the present invention.

Referring to FIG. 1 to FIG. 5, where FIG. 1 is a schematic isometric view of the wind turbine according to the present invention, FIG. 2 is a schematic side view of the wind turbine according to the present invention, FIG. 3 is a schematic side view of the present invention, FIG. 4 is a schematic partial side view of the present invention, and FIG. 5 is a schematic cross sectional view of a transmission sliding bush according to the present invention.

As shown, the present invention is a fully passive device for fixing the torque output of the blades of a wind turbine 1. The wind turbine 1 comprises a blade assembly 2, the present invention 3, a generator 4, and a framework 5. The blade assembly 2 comprises a pitch angle adjustment device 21 and blades 22. As such, the present invention 3 can effectively maintain a constant torque generated by the blades 22 to the generator 3 without requiring any external power input and measurement signal generated from other devices. Therefore, the energy consumption, the composition complexity, and the set-up and operation cost could be effectively reduced, and the reliability of the wind turbine could be increased.

The present invention 3 comprises a coaxial planetary gearbox 31, a front high speed transmission axis 32, a torque control device 33, a rear high speed transmission axis 34, a braking system 35, a low speed transmission axis 36, and a pitch angle adjustment axis 37.

The coaxial planetary gearbox 31 is fixed on the framework 5 to convert a low rotation speed and high torque input from the blade assembly 2 into a high rotation speed and low torque output to the front high speed transmission axis 32.

The front high speed transmission axis 32 connects the coaxial planetary gearbox 31 and the torque control device 33, and it transmits the torque from the coaxial planetary gearbox 31 to the torque control device 33. The front high speed transmission axis 32 has a front guide 321 disposed at the farther end away from the coaxial planetary gearbox 31. The shape of the front guide 321 depends on the magnitude of the torque being transmitted and the properties of the torque maintaining spring 333. The front guide 321 is connected to the front key 3312 to transmit the torque of the front high speed transmission axis 32 to the torque control device 33. In addition, when the front guide 321 connects to the front key 3312, the transmitted torque will be in a form of a combination of a push force and a torque.

The torque control device 33 can be a cylinder type, a linkage type, or a combination of the previous two. The torque control device 33 transmits the torque from the front high speed transmission axis 32 to the rear high speed transmission axis 34 and drives the pitch angle adjustment axis 37 to vary the pitch angle of the blades 22. The torque control device 33 comprises a transmission sliding bush 331, a thrust flange 332 disposed on the transmission sliding bush 331, a torque maintaining spring 333 connects the thrust flange 33 and a thrust block 334 fixed on the framework 5. The transmission sliding bush 331 is the component which could transmit the torque from the front high speed transmission axis 32 to the rear high speed transmission axis 34. The thrust flange 332 is the interface of the forces from the transmission sliding bush 331 and the torque maintaining spring 333 and would drive the transmission sliding bush 331 to move toward the direction of the blade assembly 2 or the generator 4. The torque maintaining spring 333 is used to counterbalance the force derived from the torque transmission process among the front high speed transmission axis 32, the rear high speed transmission axis 34 and the transmission sliding bush 331. The thrust block 334 is connected to an end of the torque maintaining spring 333 and counterbalances the force from the torque maintaining spring 333. The transmission sliding bush 331 comprises a front ring 3311, a front key 3312, a connector 3313, a rear key 3314, and a rear ring 3315. The front ring 3311 is used to keep the transmission sliding bush 331 moving along the surface of the front high speed transmission axis 32 smoothly. The front key 3312 connects to the front guide 321 to transmit the torque from the high speed transmission axis 32 to the transmission sliding bush 331, and the transmitted torque will be in a form of a combination of a push force and a torque. The connector 3313 is used to transmit the driving force of adjusting the pitch angle of the blades from the torque control device 33 to the pitch angle adjustment axis 37. The rear key 3314 connects to a rear guide 341 so as to transmit the torque from the transmission sliding bush 331 to the rear high speed transmission axis 34, and the transmitted torque will be in a form of a combination of a push force and a torque. The rear ring 3315 is used to keep the transmission sliding bush 331 moving along the surface of the rear high speed transmission axis 34 smoothly.

The rear high speed transmission axis 34 is connected to the torque control device 33 to transmit the torque from the torque control device 33 to the generator 4. The rear high speed transmission axis 34 has a rear guide 341 disposed at the farther end away from the generator 4. The shape of the rear guide 341 depends on the magnitude of the torque being transmitted and the properties of the torque maintaining spring 333. The rear guide 341 is connected to the rear key 3314 and transmits the torque from the torque control device 33 to the generator 4. Besides, the transmitted torque will be in a form of a combination of a push force and a torque.

The braking system 35 is disposed between the coaxial planetary gearbox 31 and the generator 4 to stop the rotation of the blades 22 when the wind speed is not in the rated range. The braking system 35 comprises a front braking driving ring 351 installed on the front high speed transmission axis 32, a rear braking driving ring 352 installed on the rear high speed transmission axis 34, a disk braking calipers 353 fixed on the framework 5, and a braking disk 354 fixed on the rear high speed transmission axis 34 and partially contained in the disk braking calipers 353. When the wind speed is too slow, the front braking driving ring 351 will be pushed by the transmission sliding bush 331 and drives the disk braking calipers 353 to clamp the braking disk 354 to stop the rotation of the blade assembly 2.

When the wind speed exceeds the rated range, the rear braking driving ring 352 will be pushed by the transmission sliding bush 331 and drives the disk braking calipers 353 to clamp the braking disk 354 to stop the rotation of the blade assembly 2. The low speed transmission axis 36 is disposed between the blade assembly 2 and the coaxial planetary gearbox 31 to transmit the torque from the blade assembly 2 to the coaxial planetary gearbox 31.

The pitch angle adjustment axis 37 is connected to the blade assembly 2 and the torque control device 33 to transmit the pitch angle adjustment output from the torque control device 33 to the pitch angle adjustment device 21 of the blade assembly 2, so as to change the pitch angle of the blades 22 and to maintain the torque output of the blades 22.

The pitch angle adjustment axis 37 may be a solid axis, a hollow axis, a bush, or a combination of the previous three. The pitch angle adjustment axis 37 connects the blade assembly 2 and the torque control device 33 to transmit the pitch angle adjustment output of the torque control device 33 to the pitch angle adjustment device 21 so as to adjust the pitch angle of the blades 22 and to fix the torque output of the blades 22.

Thus a novel device for controlling torque output of wind turbine blades is obtained.

When the present invention is implemented, the wind drives the blade assembly 2 to rotate and generates a torque output which will be transmitted to the coaxial planetary gearbox 31 through the low speed transmission axis 36. The coaxial planetary gearbox 31 converts the low rotation speed and high torque input from the blade assembly 2 to a high rotation speed and low torque output to the front high speed transmission axis 32.

The front guide 321 of the high speed transmission axis 32 is connected to the front key 3312 of the transmission sliding bush 331 of the torque control device to transmit the torque from the front high speed transmission axis 32 to the transmission sliding bush 331. In this torque transmission process, a push force along the axial direction of the transmission sliding bush 331 will be derived. The rear high speed transmission axis 34 receives the torque from the transmission sliding bush 331 through the rear guide 341 and the rear key 3314 in the similar manner. The rear high speed transmission axis 34 transmits the torque it receives from the torque control device 33 to the generator 4.

The derived force from the torque transmission process between the torque control device 33 and the front high speed transmission axis 32 or the rear high speed transmission axis 34 will be transmitted to the thrust flange 332. When the derived force is smaller than the force which the torque maintaining spring 333 exerts on the thrust flange 332, the transmission sliding bush 331 moves toward the direction of the blade assembly 2 and drives the pitch angle adjustment axis 37 to move in the same direction. This will drive the pitch angle adjustment device 21 to increase the power coefficient of the blades 22, thereby the torque output of the blade assembly 2 will be increased. When the derived force is larger than the force which the torque maintaining spring 333 exerts on the thrust flange 332, the transmission sliding bush 331 moves toward the direction of the generator 4 and drives the pitch angle adjustment axis 37 to move in the same direction. This will drive the pitch angle adjustment device 21 to decrease the power coefficient of the blades 22, thereby the torque output of the blade assembly 2 will be reduced.

When the wind speed is too slow and is not in the rated range, the torque maintaining spring 333 pushes the transmission sliding bush 331 to contact the front braking driving ring 351 and makes the front braking driving ring 351 to move along the same direction and further drives the disk braking calipers 353 to clamp the braking disk 354. Thus, the rotation of the blade assembly 2 can be stopped when the wind speed is too slow and is not in the rated range.

Similarly, when the wind speed exceeds the rated range, the transmission sliding bush 331 will contact the rear braking driving ring 352 and push the rear braking driving ring 352 to move in the same direction and further drive the disk braking calipers 353 to clamp the braking disk 354. Thus, the rotation of the blade assembly 2 can be stopped when the wind speed exceeds the rated range.

Thus, the present invention utilizes the front high speed transmission axis, the rear high speed transmission axis, and the torque control device to control the torque output of the blades of a wind turbine in constant. When the wind speed is not in the rated range, the braking system will be activated through the interaction among the front braking driving ring, the rear braking driving ring, the front guide, the rear guide, the transmission sliding bush, and the torque maintaining spring to stop the rotation of the blades of a wind turbine.

To sum up, the present invention is a device for controlling torque output of wind turbine blades which effectively improves the demerits encountered in the prior arts, including higher energy consumption, set-up cost, and operation spending with lower reliability. From all these views, the present invention can be deemed as being more effective, practical, and useful for the consumer's demand, and thus meets with the patent requirements.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device for controlling torque output of wind turbine blades, comprising:
    a coaxial planetary gearbox;
    a front high speed transmission axis, said front high speed transmission axis having a front guide at one of its ends;
    a torque control device, said torque control device comprising a transmission sliding bush, a thrust flange, a torque maintaining spring, and a thrust block;
    a transmission sliding bush, said transmission sliding bush comprising a front key, a rear key, a front ring, a rear ring, and a connector;
    a rear high speed transmission axis, said rear high speed transmission axis having a rear guide at one of its ends;
    a braking system, said braking system comprising a front braking driving ring, a rear braking driving ring, a braking disk, and a disk braking calipers; and
    a pitch angle adjustment axis,
    wherein said coaxial planetary gearbox converts the low rotation speed and high torque input from the blades into a high rotation speed and low torque output to said front high speed transmission axis;
    wherein said front high speed transmission axis transmits the torque from said coaxial planetary gearbox to said torque control device through the connection between said front guide and said front key;
    wherein said torque control device transmits the torque from said front high speed transmission axis to said rear high speed transmission axis through the connection between said rear guide and said rear key;

wherein said rear high speed transmission axis transmits the torque from said torque control device to a generator;

wherein said braking system is driven by the said torque control device to stop the rotation of the blades of a wind turbine through said disk braking calipers clamps said braking disk when the wind speed is not in the rated range; and wherein said pitch angle adjustment axis transmits the pitch angle adjustment output from said torque control device to the pitch angle adjustment device.

2. The device for controlling torque output of wind turbine blades as claimed in claim 1, wherein said front high speed transmission axis has a said front guide disposed at the farther end away from said coaxial planetary gearbox, and said front guide connects to said front key.

3. The device for controlling torque output of wind turbine blades as claimed in claim 2, wherein said front guide has a shape depends on the magnitude of the torque being transmitted and the properties of said torque maintaining spring.

4. The device for controlling torque output of wind turbine blades as claimed in claim 1, wherein said torque control device has the configuration in a cylinder type, a linkage type, or a combination of the previous two.

5. The device for controlling torque output of wind turbine blades as claimed in claim 1, wherein said rear high speed transmission axis has a said rear guide disposed at the farther end away from the generator, and said rear guide connects to said rear key.

6. The device for controlling torque output of wind turbine blades as claimed in claim 5, wherein said rear guide has a shape depends on the magnitude of the torque being transmitted and the properties of said torque maintaining spring.

7. The device for controlling torque output of wind turbine blades as claimed in claim 1, wherein said pitch angle adjustment axis could be in a shape of a solid axis, a hollow axis, a bush, or a combination of the previous three.

8. The device for controlling torque output of wind turbine blades as claimed in claim 1, further comprises a low speed transmission axis disposed between the blade assembly and the coaxial planetary gearbox to transmit the torque from the blade assembly to the coaxial planetary gearbox.

* * * * *